United States Patent
Panhans et al.

(10) Patent No.: US 12,172,625 B2
(45) Date of Patent: Dec. 24, 2024

(54) SYSTEM AND METHOD FOR DETECTING AND CORRECTING ENGINE SPEED CONTROLLER SATURATION

(71) Applicant: Ford Global Technologies, LLC, Dearborn, MI (US)

(72) Inventors: Justin Panhans, Detroit, MI (US); Ameya Vivek Gadre, Ypsilanti, MI (US); Arun Sebastian, Dearborn, MI (US); Fazal Urrahman Syed, Canton, MI (US); Minku Lee, Canton, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/663,606

(22) Filed: May 16, 2022

(65) Prior Publication Data

US 2023/0365118 A1   Nov. 16, 2023

(51) Int. Cl.
| | |
|---|---|
| *B60W 20/15* | (2016.01) |
| *B60W 10/02* | (2006.01) |
| *B60W 10/06* | (2006.01) |
| *B60W 10/08* | (2006.01) |

(52) U.S. Cl.
CPC .......... *B60W 20/15* (2016.01); *B60W 10/024* (2020.02); *B60W 10/06* (2013.01); *B60W 10/08* (2013.01); *B60W 2710/0644* (2013.01); *B60W 2710/083* (2013.01)

(58) Field of Classification Search
CPC .... B60W 20/15; B60W 10/024; B60W 10/06; B60W 10/08; B60W 2710/0644; B60W 2710/083; B60W 20/13; B60W 2710/0666; B60K 6/387; B60K 6/48; B60K 6/547; B60K 2006/4825; Y02T 10/62

See application file for complete search history.

(56) References Cited

U.S. PATENT DOCUMENTS

| | | | |
|---|---|---|---|
| 9,327,721 B2 | 5/2016 | Johri et al. | |
| 10,220,833 B2 | 3/2019 | Zhang et al. | |
| 11,186,267 B2 | 11/2021 | Johri et al. | |
| 2005/0182532 A1* | 8/2005 | Tobler | B60K 6/48 701/53 |
| 2011/0098152 A1* | 4/2011 | Sah | B60K 6/365 903/945 |
| 2012/0081051 A1* | 4/2012 | Kobayashi | B60W 10/08 903/930 |
| 2012/0083953 A1* | 4/2012 | Izawa | B60L 50/16 180/65.265 |

(Continued)

FOREIGN PATENT DOCUMENTS

| | | | |
|---|---|---|---|
| DE | 102009002166 A1 * | 10/2010 | ............ B60K 6/365 |
| DE | 102018125536 A1 * | 4/2019 | ........... B60W 10/02 |
| WO | 2014022066 A1 | 2/2014 | |

*Primary Examiner* — Hung Q Nguyen
(74) *Attorney, Agent, or Firm* — David Kelley; McCoy Russell LLP (57) ABSTRACT

Systems and methods for operating a hybrid vehicle having an internal combustion engine are presented. In one example, the internal combustion engine is operated in a speed control mode and torque of an electric machine is adjusted so that a possibility of an engine speed controller saturating may be reduced.

18 Claims, 4 Drawing Sheets

(56) References Cited

U.S. PATENT DOCUMENTS

| | | | |
|---|---|---|---|
| 2013/0289810 A1* | 10/2013 | Holmes | B60K 6/24 180/65.265 |
| 2017/0232969 A1* | 8/2017 | Hunt | B60T 8/17 477/93 |
| 2018/0009433 A1* | 1/2018 | Johri | F02D 41/065 |
| 2020/0391723 A1* | 12/2020 | Syed | B60W 20/40 |

* cited by examiner

SYSTEM AND METHOD FOR DETECTING AND CORRECTING ENGINE SPEED CONTROLLER SATURATION

FIELD

The present description relates to methods and a system for correcting saturation of an engine speed controller for a hybrid vehicle. The methods and system may be applied to hybrid vehicles that include an engine that operates in a speed control mode.

BACKGROUND AND SUMMARY

An engine of a hybrid vehicle may be operated in a speed control mode during select vehicle operating conditions. The engine may be controlled to achieve a requested or desired speed (e.g., an engine idle speed) while it is operated in speed control mode. In particular, engine torque may be adjusted so that engine speed follows a requested engine speed. The engine torque is permitted to change so that engine speed may follow the requested engine speed even though a load applied to the engine is changed. However, the engine may achieve the requested speed without producing torque that is sufficient to charge the vehicle's traction battery while the engine is operated in speed control mode. In addition, it may be possible for an electric machine in the hybrid vehicle driveline to excite the engine's speed controller so that the engine generates more than a desired amount of torque. Therefore, it may be desirable to provide a way of reducing a possibility that the engine may produce more or less torque than may be desired while operating in the speed control mode.

The inventors herein have recognized the above-mentioned issues and have developed a method for operating a driveline, comprising: operating an internal combustion engine in a speed control mode; and adjusting a requested torque of an electric machine to a specified charging torque in response to a condition of a requested internal combustion engine torque being within a threshold torque amount of a minimum instantaneous internal combustion engine torque or the requested internal combustion engine torque being greater than threshold torque.

By adjusting torque of an electric machine to a specified charging torque in response to requested engine torque, it may be possible to reduce a possibility of an engine speed controller from becoming saturated so that there may be insufficient engine torque to charge a traction battery. In addition, the approach described herein may prevent the engine from generating a large amount of torque and operating at less efficient operating conditions.

The present description may provide several advantages. In particular, the approach may improve hybrid driveline operation while an engine is operating in a speed control mode. Further, the approach may improve charging of a traction battery while an engine is operated in a speed control mode. Additionally, the approach may improve engine efficiency while the engine operates in a speed control mode.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
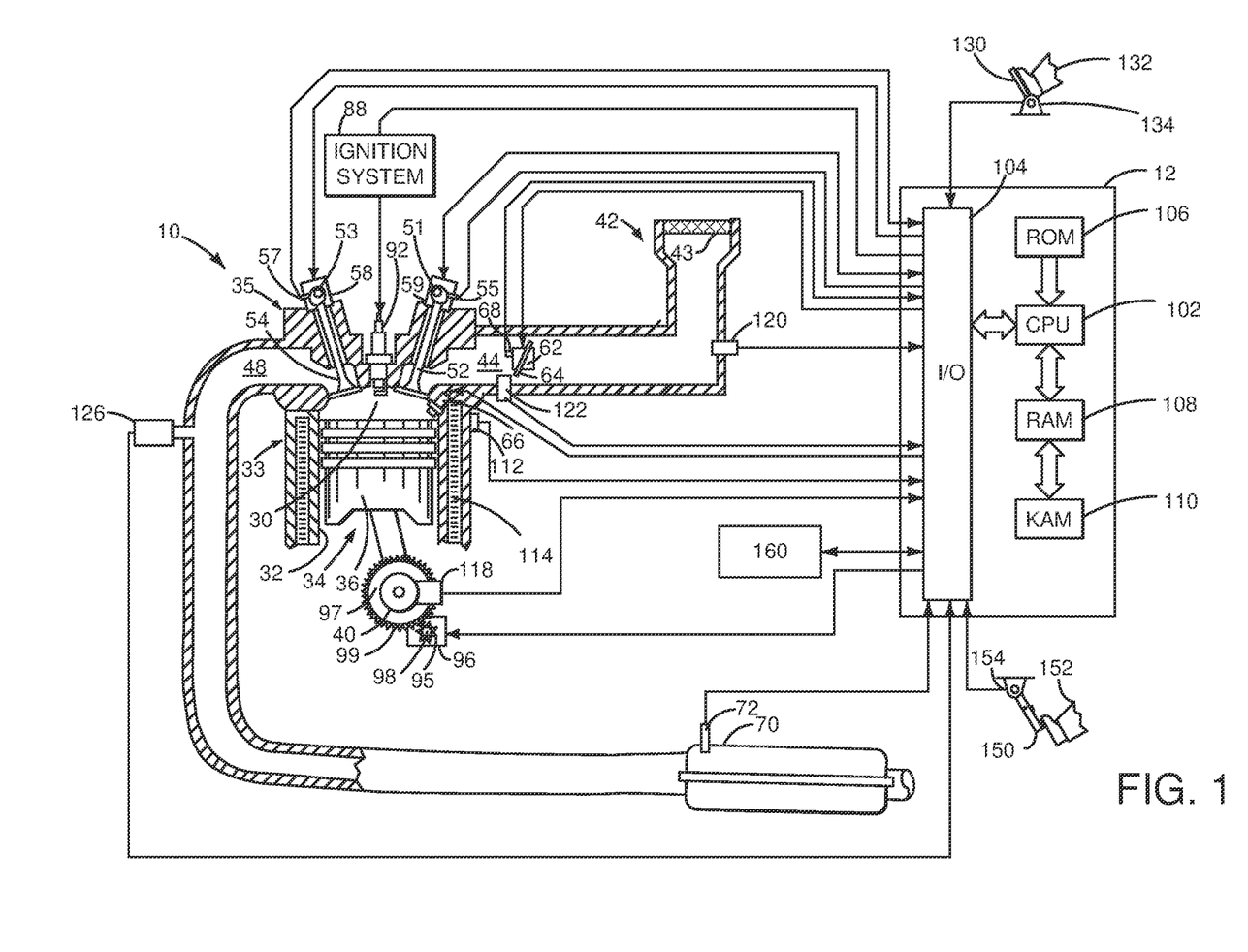
FIG. 1 is a schematic diagram of an engine.
Figure 2:
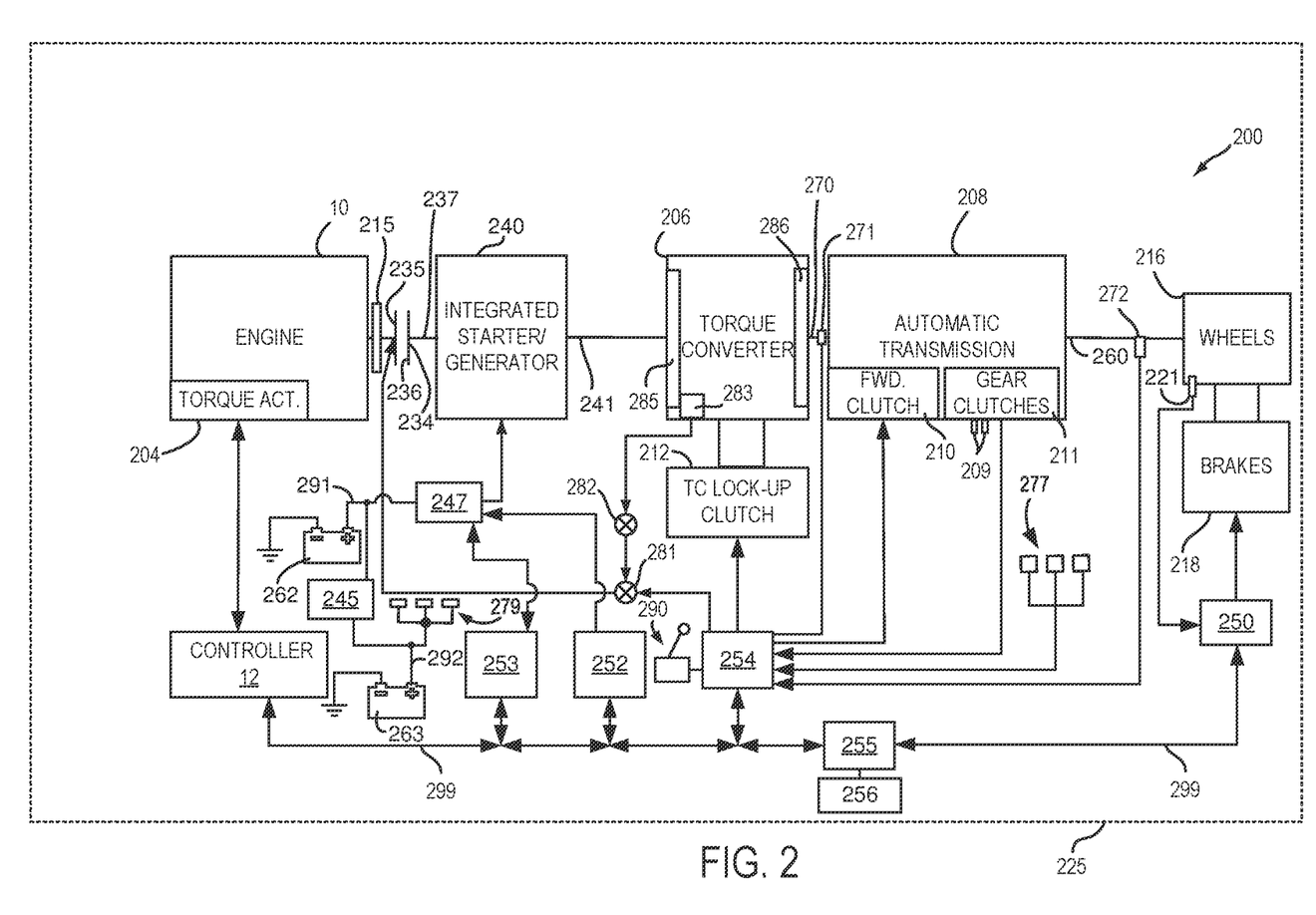
FIG. 2 is a schematic diagram of a hybrid vehicle driveline including the engine of FIG. 1.
Figure 3:
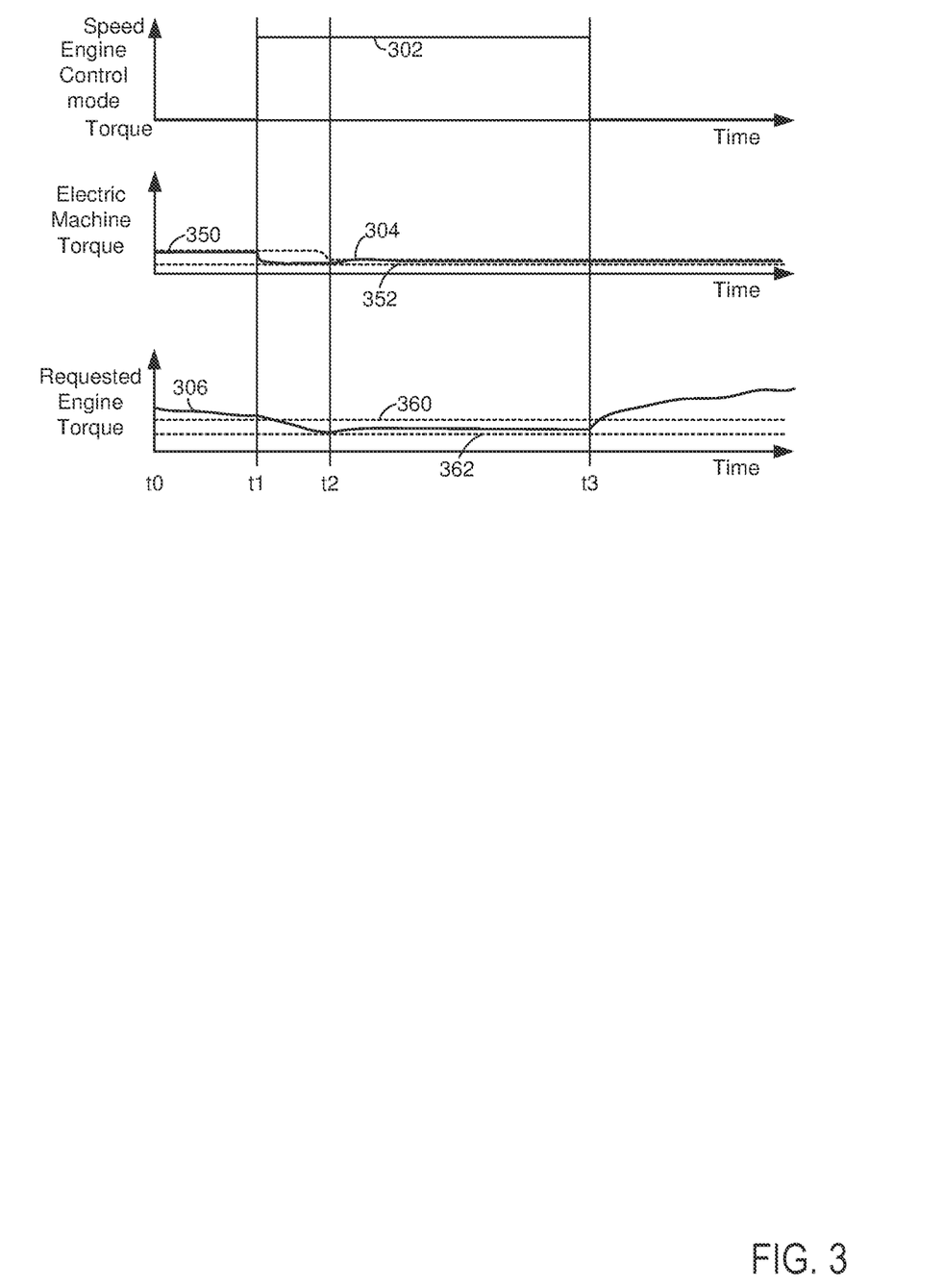
FIG. 3 shows an example sequence of an engine operating in a speed control mode according to the method of FIG. 4.
Figure 4:
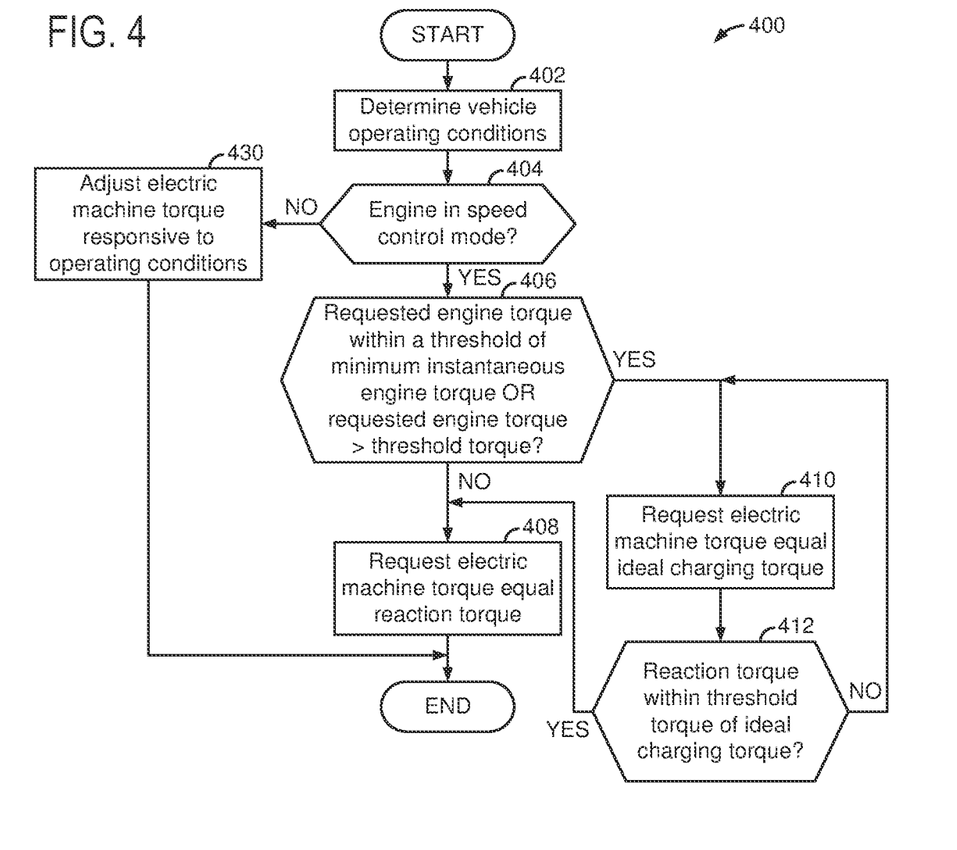
FIG. 4 shows a method for operating an engine of a hybrid vehicle in a speed control mode.

The present description is related to improving operation of a hybrid vehicle driveline with an engine that is operating in a speed control mode. The engine may be included in a hybrid vehicle that includes an electric machine, such as an integrated starter/generator (ISG). The electric machine may supply positive torque to propel the hybrid vehicle or a negative torque to charge a traction battery. The engine may be of the type that is shown in FIG. 1. The engine may be part of a hybrid powertrain or driveline as shown in FIG. 2. Plots of selected vehicle variables are shown in FIG. 3 for an operating sequence where an engine is operated in a speed control mode. A method for operating a driveline of a hybrid vehicle when an engine is operated in speed control mode is shown in FIG. 4.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to electric machine input shaft 237.

Electric machine 240 may be operated to provide power to powertrain 200 or to convert powertrain power into electrical energy to be stored in electric energy storage device 262 in a regeneration mode. Electric machine 240 is in electrical communication with energy storage device 262. Electric machine 240 has a higher output power capacity than starter 96 shown in FIG. 1. Further, electric machine 240 directly drives powertrain 200 or is directly driven by powertrain 200. There are no belts, gears, or chains to couple electric machine 240 to powertrain 200. Rather, electric machine 240 rotates at the same rate as powertrain 200. Electrical energy storage device 262 (e.g., high voltage battery or power source, which may be referred to as a traction battery) may be a battery, capacitor, or inductor. The downstream side of electric machine 240 is mechanically coupled to the impeller 285 of torque converter 206 via shaft 241. The upstream side of the electric machine 240 is mechanically coupled to the disconnect clutch 236. Electric machine 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as electric machine 240.

Automatic transmission 208 includes gear clutches 211 (e.g., gears 1-10) and forward clutch 210. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear shift lever sensors, and an ambient temperature sensor. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an engine; an electric machine; a driveline disconnect clutch positioned in a driveline between the engine and the electric machine; and a controller including executable instructions stored in non-transitory memory that cause the controller to adjust an electric machine torque to a specified reaction torque. In a first example, the system includes where the reaction torque is an amount of torque to rotate a torque converter impeller at a requested speed minus actual engine torque. In a second example that may include the first example, the system includes where the reaction torque includes an amount of torque for an electric machine to power vehicle electrical accessories at the requested speed. In a third example that may include one or both of the first and second examples, the system includes where the controller adjusts the torque of the electric machine to the specified reaction torque in response to a first condition or a second condition not being present. In a fourth example that may include one or more of the first through third examples, the system includes where the first condition is a requested internal combustion engine torque being within a threshold torque amount of an internal combustion engine minimum instantaneous torque. In a fifth example that may include one or more of the first through fourth examples, the system includes where the second condition is the requested internal combustion engine torque being greater than a second threshold torque. In a sixth example that may include one or more of the first through fifth examples, the system includes where the second threshold torque is based on an expected maximum charging torque.

Referring now to FIG. 3, a prophetic driveline operating sequence is shown. The operating sequence of FIG. 3 may be provided via the system of FIGS. 1 and 2 in cooperation with the method of FIG. 4. The vertical lines at times t0-t3 represent times of interest during the operating sequence. The plots are time aligned. The sequence of FIG. 3 may be performed when the driveline disconnect clutch is fully closed so that the electric machine 240 is coupled to engine 10.

The first plot from the top of FIG. 3 is a plot of a state of an engine control mode versus time. The vertical axis represents the engine control mode and the engine is operated in a speed control mode when trace 302 is at a higher level near the vertical axis arrow. The engine is operated in a torque control mode when trace 302 is at a level that is near the horizontal axis. The horizontal axis represents time and time increases from the left side of the plot to the right side of the plot. Trace 302 represents the engine control mode state.

The second plot from the top of FIG. 3 is a plot of electric machine torque (e.g., electric machine 240 of FIG. 2) versus time. The vertical axis represents torque of the electric machine and the magnitude of torque increases in the direction of the vertical axis arrows. The electric machine torque amount at the level of the horizontal axis is zero. The horizontal axis represents time and time increases from the left side of the plot to the right side of the plot. Trace 304 represents electric machine torque.

Line 350 represents a requested reaction torque provided by the electric machine (e.g., 240 of FIG. 2). The requested electric machine reaction torque may be estimated via the following equation:

$$T_{react} = T_{Imp\_est} - T_{eng\_act}$$

where $T_{react}$ is the requested reaction torque, $T_{Imp\_est}$ is an estimate of an amount of torque required to rotate the torque converter impeller at a desired speed, and $T_{eng\_act}$ is an actual amount of torque generated by the engine and delivered to the hybrid driveline.

Line 352 represents an ideal or specified charging torque that may be generated via the electric machine consuming torque from the driveline at the present speed of the engine and the electric machine. The ideal or specified charging torque may be estimated via the following equation:

$$T_{charg} = T_{Eng\_eff} - T_{loss}$$

where $T_{charg}$ is the ideal charging torque requested of the electric machine, $T_{Eng\_eff}$ is a torque at the present engine speed where the engine operates most efficiently, and $T_{loss}$ is torque to overcome engine and rotational losses of the driveline at the transmission input shaft to rotate the engine and electric machine at their present speed (e.g., a requested speed when the engine operates in a speed control mode).

The third plot from the top of FIG. 3 is a plot of requested engine torque versus time. The vertical axis represents requested engine torque and requested engine torque increases in the direction of the vertical axis arrow. The horizontal axis represents time and time increases from the left side of the plot to the right side of the plot. Trace 306 represents requested engine torque. Line 360 represents an adjustable threshold torque that is based on a maximum expected charging torque that the engine may deliver to the electric machine to charge the traction battery while the engine is in speed control mode. Line 362 represents a minimum engine instantaneous torque that is a lowest internal combustion engine torque for a present internal combustion engine speed where the internal combustion engine does not misfire or have combustion stability being less than a threshold combustion stability level.

At time t0, the engine is running (e.g., rotating and combusting fuel) and the engine is operating in a torque control mode (e.g., engine speed is allowed to vary and engine torque is adjusted to follow a requested engine torque). The electric machine torque is at the level of a reaction torque, which may be determined as previously mentioned. The requested engine torque is greater than the adjustable threshold torque that is based on the maximum expected charging torque.

At time t1, the engine mode is switched from torque control mode to speed control mode. The engine is commanded to a requested engine idle speed (not shown). Since the requested engine torque is greater than the adjustable threshold torque 360, the electric machine torque is commanded to the ideal charging torque 352. The requested engine torque begins to be reduced since it takes less engine torque to overcome the reaction torque that is generated by the electric machine.

Between time t1 and time t2, the engine remains in speed control mode and the electric machine torque is reduced to the ideal or specified charging torque 352. A short time after electric machine torque is reduced to the ideal charging torque, the engine torque is reduced to a level that is near the minimum engine instantaneous torque. The requested reaction torque provided by the electric machine begins to be reduced shortly before time t2. The requested reaction torque may be decreased in response to a reduced electrical load provided by electrical power consumers of the vehicle (e.g., heated windshields, climate control systems, lighting systems, infotainment systems, etc.).

At time t2, the requested reaction torque is within a threshold amount of torque of the ideal charging torque.

Therefore, the electric machine torque is adjusted to the requested reaction torque. Since the engine is operating in speed control mode, the increased load on the engine causes the engine speed controller to demand additional torque from the engine. The requested engine torque increases to a value that is between the minimum engine instantaneous torque and the adjustable threshold torque that is based on a maximum expected charging torque that the engine may deliver to the electric machine to charge the traction battery while the engine is in speed control mode.

At time t3, the engine operating mode switches from speed control to torque control. The electric machine torque remains at the requested reaction torque and the requested engine torque is increased to meet the driver demand torque (not shown).

In this way, the engine speed controller may avoid becoming saturated at a minimum engine instantaneous torque so that the electric machine may charge the traction battery. In addition, the engine speed controller may avoid requesting large amounts of engine torque while the engine operates in speed control mode so that inefficient engine operation may be avoided.

Referring now to FIG. 4, a method for operating a hybrid vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3.

At 402, method 400 determines vehicle operating conditions. Vehicle operating conditions may be determined via receiving sensor outputs as shown in FIGS. 1 and 2 into a controller. Vehicle operating conditions may include but are not limited to engine operating mode, transmission fluid temperature, requested engine torque, requested electric machine torque, driveline disconnect clutch state, ambient air temperature, engine speed, vehicle speed, engine temperature, and driver demand torque or power. Method 400 proceeds to 404 after vehicle operating conditions are determined.

At 404, method 400 judges whether or not the engine is operating in a speed control mode. Method 400 may judge whether or not the engine is operating in a speed control mode based on a value of a variable in controller memory. For example, if a value of the variable is one or true, the answer is yes and method 400 proceeds to 406. Otherwise, if the value is zero or false, the answer is no and method 400 proceeds to 430. When the engine is operating in a speed control mode, a speed control algorithm in controller 12 adjusts engine torque such that engine speed follows a requested engine speed, whether the requested engine speed is a constant or changing. Method 400 may close the driveline disconnect clutch before the engine is operated in the speed control mode.

At 430, method 400 adjusts electric machine torque (e.g., 240 of FIG. 2) responsive to vehicle operating conditions. In particular, method 400 may adjust electric machine torque in response to a driver demand torque or power. The electric machine may be operated as a sole propulsion source or in combination with the internal combustion engine to meet the driver demand torque. In addition, the electric machine may be operated in a generating mode when driver demand torque and torque to recharge the traction battery may be provided via the engine. Method 400 proceeds to exit.

At 406, method 400 judges if requested engine torque is within a threshold torque amount of a minimum instantaneous engine torque (e.g., a lowest internal combustion engine torque for a present internal combustion engine speed where the internal combustion engine does not misfire or have combustion stability being less than a threshold combustion stability level) OR the requested engine torque is greater than a threshold torque that is based on a maximum charging torque while the engine is in speed control mode (e.g., a maximum amount of engine torque that may be applied to charge the traction battery). The conditions of 406 may be expressed via the following equation:

$$(T_{EngReq} > T_{Engmin} - T_{Thres1} \text{ AND } T_{EngReq} < T_{Engmin} + T_{Thres1}) \text{ OR } T_{EngReq} > T_{Thres2}$$

where $T_{EngReq}$ is the requested engine torque, $T_{Engmin}$ is the minimum instantaneous engine torque, $T_{Thres1}$ is a first threshold torque amount, AND is a logical "and" operator, OR is a logical "or" operator, and $T_{Thresh2}$ is a second threshold torque amount. If method 400 judges that the requested engine torque is within a threshold torque amount of a minimum instantaneous engine torque OR the requested engine torque is greater than a threshold torque that is based on a maximum charging torque while the engine is in speed control mode, the answer is yes and method 400 proceeds to 410. Otherwise, the answer is no and method 400 proceeds to 408.

At 408, method 400 method 400 requests that torque of the electric machine (e.g., 240 of FIG. 2) is equal to a reaction torque. The reaction torque may be determined via the following equation:

$$T_{React} = T_{Imp} - T_{Engact}$$

where $T_{React}$ is the reaction torque, $T_{Imp}$ is the torque required to rotate the torque converter at the present speed of the engine and the electric machine, and $T_{Engact}$ is the actual torque generated by the engine at the engine crankshaft. Method 400 proceeds to exit after torque output of the electric machine is adjusted to equal the reaction torque.

At 410, method 400 adjusts the torque of the electric machine (e.g., 240 of FIG. 2) to equal to the ideal charging torque $T_{charg}$. Method 400 proceeds to 412.

At 412, method 400 judges if the reaction torque $T_{React}$ is within a within a threshold torque amount of the ideal charging torque $T_{charg}$. The conditions of 412 may be expressed via the following equation:

$$(T_{React} > T_{charg} - T_{Thres3} \text{ AND } T_{React} < T_{charg} + T_{Thres3})$$

where $T_{Thres3}$ is a third threshold torque amount and where the remaining variables are as previously described. If method 400 judges that the reaction torque $T_{React}$ is within a within a threshold torque amount of the ideal charging torque $T_{charg}$ the answer is yes and method 400 proceeds to 408. Otherwise, the answer is no and method 400 returns to 410.

In this way, method 400 may adjust torque output of the electric machine so that a battery may be charged or so that torque of the engine remains below a threshold torque that is based on a maximum expected charging torque.

Thus, the method of FIG. 4 provides for a method for operating a driveline, comprising: operating an internal combustion engine in a speed control mode; and adjusting a requested torque of an electric machine to a specified charging torque in response to a condition of a requested internal combustion engine torque being within a threshold torque amount of a minimum instantaneous internal combustion engine torque or the requested internal combustion engine torque being greater than threshold torque. In a first example, the method further comprises adjusting the requested torque of the electric machine to a specified reaction torque in response the condition of the requested engine torque being within the threshold torque amount of the minimum instantaneous engine torque or the requested engine torque being greater than threshold torque not being true. In a second example that may include the first method, the method further comprising adjusting the requested torque of the electric machine to a specified reaction torque in response to the specified reaction torque being within a threshold torque of the specified charging torque. In a third example that may include one or both of the first and second examples, the method includes where the specified reaction torque is a function of vehicle electrical loads. In a fourth example that may include one or more of the first through third examples, the method includes where a speed of the internal combustion engine is adjusted to follow a requested speed in the speed control mode. In a fifth example that may include one or more of the first through fourth examples, the method includes where torque of the internal combustion engine is adjusted for the internal combustion engine to follow the requested speed. In a sixth example that may include one or more of the first through fifth examples, the method includes where the specified charging torque is based on internal combustion engine efficiency at a present internal combustion engine speed. In a seventh example that may include one or more of the first through sixth examples, the method includes where the minimum instantaneous internal combustion engine torque is lowest internal combustion engine torque for a present internal combustion engine speed where the internal combustion engine does not misfire or have combustion stability being less than a threshold combustion stability level.

The method of FIG. 4 also provides for a method for a method for operating a driveline, comprising: operating an internal combustion engine in a speed control mode; adjusting a requested torque of an electric machine to a first torque in response to a reaction torque of an electric machine being within a threshold torque of a specified charging torque while operating the internal combustion engine in the speed control mode; and adjusting a requested torque of an electric machine to a second torque in response to a reaction torque of an electric machine not being within a threshold torque of a specified charging torque while operating the internal combustion engine in the speed control mode. In a first example, the method includes where the first torque is the reaction torque. In a second example that may include the first example, the method includes where the second torque is specified charging torque. In a third example that may include one or both of the first and second examples, the method includes where the electric machine is positioned in a driveline between a disconnect clutch and a transmission. In a fourth example that may include one or more if the first through third examples, the method includes where the internal combustion engine is commanded to an idle speed while being operated in the speed control mode.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
 operating an internal combustion engine in a speed control mode; and
 adjusting a requested torque of an electric machine to a specified charging torque in response to a condition of a requested internal combustion engine torque being within a first threshold torque amount of a minimum instantaneous internal combustion engine torque or the requested internal combustion engine torque being greater than a second threshold torque.

2. The method of claim 1, further comprising adjusting the requested torque of the electric machine to a specified reaction torque in response the condition of the requested internal combustion engine torque being within the first threshold torque amount of the minimum instantaneous internal combustion engine torque or the requested internal combustion engine torque being greater than the second threshold torque not being true.

3. The method of claim 1, further comprising adjusting the requested torque of the electric machine to a specified reaction torque in response to the specified reaction torque being within a threshold torque of the specified charging torque.

4. The method of claim 3, where the specified reaction torque is a function of vehicle electrical loads.

5. The method of claim 1, where a speed of the internal combustion engine is adjusted to follow a requested speed in the speed control mode.

6. The method of claim 1, where torque of the internal combustion engine is adjusted for the internal combustion engine to follow a requested speed.

7. The method of claim 1, where the specified charging torque is based on internal combustion engine efficiency at a present internal combustion engine speed.

8. The method of claim 1, where the minimum instantaneous internal combustion engine torque is lowest internal combustion engine torque for a present internal combustion engine speed where the internal combustion engine does not misfire or have combustion stability being less than a threshold combustion stability level.

9. A system, comprising:
 an engine;

an electric machine;

a driveline disconnect clutch positioned in a driveline between the engine and the electric machine; and a controller including executable instructions stored in non-transitory memory that cause the controller to adjust an electric machine torque to a specified reaction torque;

where the controller adjusts a torque of the electric machine to the specified reaction torque in response to a first condition or a second condition not being present; and where the first condition is a requested internal combustion engine torque being within a threshold torque amount of an internal combustion engine minimum instantaneous torque.

10. The system of claim 9, where the specified reaction torque is an amount of torque to rotate a torque converter impeller at a requested speed minus an actual engine torque.

11. The system of claim 10, further comprising additional instructions to close the driveline disconnect clutch before adjusting the electric machine torque to the specified reaction torque.

12. The system of claim 9, where the second condition is the requested internal combustion engine torque being greater than a second threshold torque.

13. The system of claim 12, where the second threshold torque is based on an expected maximum charging torque.

14. A method for operating a driveline, comprising:

operating an internal combustion engine in a speed control mode;

adjusting a requested torque of an electric machine to a first torque in response to a reaction torque of the electric machine being within a threshold torque of a specified charging torque while operating the internal combustion engine in the speed control mode; and adjusting the requested torque of the electric machine to a second torque in response to the reaction torque of the electric machine not being within the threshold torque of the specified charging torque while operating the internal combustion engine in the speed control mode.

15. The method of claim 14, where the first torque is the reaction torque.

16. The method of claim 14, where the second torque is specified charging torque.

17. The method of claim 16, where the electric machine is positioned in the driveline between a disconnect clutch and a transmission.

18. The method of claim 17, where the internal combustion engine is commanded to an idle speed while being operated in the speed control mode.

* * * * *